United States Patent
Zeller et al.

(10) Patent No.: US 6,336,954 B1
(45) Date of Patent: Jan. 8, 2002

(54) PROCESS AND PLANT FOR THE DIRECT REDUCTION OF PARTICULATE IRON-OXIDE-CONTAINING MATERIAL

(75) Inventors: Siegfried Zeller, Leonding; Konstantin Milionis, St. Georgen; Johann Reidetschläger, Linz; Leopold Werner Kepplinger, Leonding; Johann Zirngast, Marchtrenk; Johannes Schenk, Linz, all of (AT); Roy Hubert Whipp, Jr., Windermere, FL (US)

(73) Assignee: Voest-Alpine Industrieanlagenbau GmbH, Linz (AT)

( * ) Notice: Subject to any disclaimer, the term of this patent is extended or adjusted under 35 U.S.C. 154(b) by 0 days.

(21) Appl. No.: 09/505,559

(22) Filed: Feb. 17, 2000

Related U.S. Application Data (63) Continuation of application No. PCT/AT98/00191, filed on Aug. 12, 1998.

(30) Foreign Application Priority Data

Aug. 18, 1997 (AT) ................................ 1382/97

(51) Int. Cl.⁷ ............................................ C21B 13/00
(52) U.S. Cl. ........................................ 75/380; 75/450
(58) Field of Search ................................. 75/450, 380

(56) References Cited

U.S. PATENT DOCUMENTS

| | | | |
|---|---|---|---|
| 3,205,066 A | 9/1965 | Robson et al. | 75/26 |
| 3,982,901 A | 9/1976 | Steever et al. | 23/284 |
| 3,983,927 A | 10/1976 | Steever et al. | 165/1 |
| 5,082,251 A | 1/1992 | Whipp | 266/142 |
| 5,810,906 A * | 9/1998 | Stephens, Jr. | 75/505 |

FOREIGN PATENT DOCUMENTS

| | | |
|---|---|---|
| DE | 130155 | 3/1978 |
| EP | 0345467 | 12/1989 |
| EP | 0571358 | 11/1993 |
| GB | 1115712 | 5/1968 |
| GB | 1349477 | 4/1974 |
| WO | 92/02458 | 2/1992 |
| WO | 97/13879 | 4/1997 |

* cited by examiner

Primary Examiner—Melvyn Andrews
(74) Attorney, Agent, or Firm—Ostrolenk, Faber, Gerb & Soffen, LLP (57) ABSTRACT

A process for the direct reduction of particulate iron-oxide-containing material by fluidization. A synthesis gas is introduced as a reducing gas into several fluidized bed zones consecutively arranged in series for the reducing gas. The reducing gas is conducted from one fluidized bed zone to another fluidized bed zone in counterflow to the particulate iron-oxide containing material. In order to reduce operating costs and, in particular, the energy demand, the temperature of the iron-oxide-containing material is adjusted in the first fluidized bed zone to be either below 400° C. (and, preferably, below 350° C.), or above 580° C. (and preferably about 650° C.), or to a temperature ranging from 400° C. to 580° C. If the temperature of the iron-oxide-containing material in the first fluidized bed zone is adjusted to be below 400° C., the temperature range in the following fluidized bed zone between 400° C. and 580° C. is passed through within a period of 10 minutes and, preferably, within 5 minutes. If the temperature of the iron-oxide-containing material in the first fluidized bed zone is adjusted to be above 580° C., the temperature range in the first fluidized bed zone between 400° C. and 580° C. is passed through within a period of time of maximally 10 minutes and, preferably, 5 minutes. If the temperature of the iron-oxide-containing material in the first fluidized bed zone is adjusted to be in the range of from 400° C. to 580° C., the iron-oxide-containing material remains within that temperature range for a maximum of 10 minutes and, preferably, 5 minutes, and the material is passed on into the following fluidized bed zone immediately after having reached the desired temperature.

20 Claims, 5 Drawing Sheets

PROCESS AND PLANT FOR THE DIRECT REDUCTION OF PARTICULATE IRON-OXIDE-CONTAINING MATERIAL

CROSS-REFERENCE TO RELATED APPLICATIONS

This is a continuation application of International Application PCT/GB98/00191, with an International filing date of Aug. 12, 1998.

BACKGROUND OF THE INVENTION

The invention relates to a process for the direct reduction of particulate iron-oxide-containing material by fluidization, wherein synthesis gas such as reformed natural gas is introduced as a reducing gas into several fluidized bed zones consecutively arranged in series for the reducing gas and is conducted from one fluidized bed zone to another fluidized bed zone in counterflow to the particulate iron-oxide containing material, and wherein heating of the iron-oxide-containing material is effected in the fluidized bed zone arranged first in the flow direction of the iron-oxide-containing material and direct reduction is carried out in the further fluidized bed zone(s), as well as a plant for carrying out the process.

A process of this kind is known from U.S. Pat. No. 5,082,251, WO-A-92/02458 and EP-A-0 571 358. According to U.S. Pat. No. 5,082,251, iron-rich fine ore is reduced in a system of fluidized bed reactors arranged in series by aid of a reducing gas under elevated pressure. The thus produced iron powder is then subjected to hot or cold briquetting.

The reducing gas is produced by catalytic reformation of desulfurized and preheated natural gas with superheated water vapor in a conventional reformer furnace. Afer this, the reformed gas is cooled in a heat exchanger and, subsequently, the $H_2$ portion in the reducing gas is increased by CO conversion by aid of an iron oxide catalyst. After this, the $CO_2$ forming as well as the $CO_2$ coming from the reformer are eliminated in a $CO_2$ scrubber.

This gas is mixed with the reducing gas (top gas) consumed only partially, heated and the fine ore is reduced in three steps (three fluidized bed reactors) in counterflow.

The ore flow starts with drying and subsequent screening. Then, the ore gets into a preheating reactor in which natural gas is burnt. In three consecutive reactors, the fine ore is reduced under elevated pressure.

From EP-A 0 571 358 it is known to realize the reduction of fine ore not exclusively via the strongly endothermic reaction with $H_2$ according to $$Fe_2O_3+3H_2=2Fe+3H_2-\Delta H,$$

but additionally via the reaction with CO according to $$Fe_2O_3+3CO=2Fe+3CO_2+\Delta H,$$

which is exothermic. It is thereby feasible to considerably lower operating costs and, in particular, energy costs.

According to the prior art, direct reduction, because of the kinetics of the known processes, involves magnetite formation during direct reduction in a layer constantly growing from outside towards inside and forming on each particle or grain of the iron-oxide-containing material. It has been shown in practice that the formation of magnetite has an inhibiting effect on direct reduction with a reducing gas. Thus, it is feasible only at elevated expenditures, i.e., by increasing the consumption of reducing gas, to obtain a more or less complete reduction of the iron-oxide-containing material charged. In particular, it is necessary to make available a reducing gas having a high reduction potential even in the fluidized bed zones arranged first.

SUMMARY OF THE INVENTION

The invention aims at avoiding these disadvantages and difficulties and has as its object to further develop a process of the initially defined kind with a view to lowering the energy demand by fully utilizing the chemical potential of the reducing gas. In particular, operating costs are to be considerably lowered by utilizing the reducing gas to an optimum degree both in terms of reduction potential and in terms of sensible heat.

In accordance with the invention, this object is achieved in that a temperature of the iron-oxide-containing material of either below 400° C. and, preferably, below 350° C., or above 580° C. and, preferably about 650° C., or a temperature ranging from 400 to 580° C. is adjusted in the first fluidized bed zone, wherein, at a temperature adjustment to below 400° C., the temperature range between 400° C. and 580° C. in the fluidized bed zone following the first fluidized bed zone in the flow direction of the iron-oxide-containing material is passed through within a period of 10 minutes and, preferably, within 5 minutes, and wherein, at a temperature adjustment to above 580° C., the temperature range between 400° C. and 580° C. is passed through within a period of maximally 10 minutes and, preferably, 5 minutes, and wherein, furthermore, at a temperature adjustment in the range of from 400° C. to 580° C., the iron-oxide-containing material remains within that temperature range for a maximum of 10 minutes and, preferably, 5 minutes and is passed on into the fluidized bed zone following next immediately after having reached the desired temperature.

By these measures, it is feasible to effectively avoid, or reduce to an acceptable extent, the formation of magnetite layers. The formation of a magnetite layer occurs very rapidly, i.e., the more rapidly the closer the temperature of the iron-oxide-containing material to the limit temperature of about 580° C. A magnetite formed on the surface of a particle of iron-oxide-containing material or an ore grain is denser than the ore itself, thus increasing the diffusion resistance of the interface between reducing gas and iron ore. As a result, the reaction speed is reduced. According to the Baur-Glaessner diagram, such a formation of a dense magnetite layer on the surface of an iron ore grain primarily occurs up to a temperature of the iron ore of 580° C. At a temperature of the iron ore of below 400° C., the formation of magnetite is again slowed down and, as a result, dense magnetite layers are formed less rapidly.

The reaction kinetics of magnetite formation is influenced by the composition of the gas and of the solid. The molecules of the reducing gas must get from the outer gas flow through the adhering gas border layer and through the macropores and micropores to the site of reaction. There, the dissociation of oxyen takes place. The oxidized gas gets back on the same way. The ore grain is, thus, reduced from outside towards inside. Thereby, its porosity increases, since the dissociated oxygen leaves hollow spaces and the original volume of the ore grain hardly shrinks. The reaction front migrates from outside towards inside into the ore grain. With dense layers, the concentration of the reducing gas decreases from outside towards inside. The gas at first diffuses from outside through the already reduced shell as far as to the reaction front, where it is reacted and then diffuses back as a reaction product. With porous surfaces, the phase border reaction occurs on the walls of the pores within the reaction front, while the gas at the same time also may diffuse inside. With dense magnetite layers on the surface of the ore grain, the reaction kinetics is inhibited because the reducing gas is impeded from diffusing by exactly that layer and the mass transfer of the reducing gas thus cannot occur in the same manner as with porous ore grains.

The basic idea of the invention is to be seen in accomplishing the transition of the temperature of the iron-oxide-containing material during heating from 400 to 580° C. within as short a period of time as possible and avoiding maintenance within that critical temperature range. When rapidly passing that temperature range, the formation of a magnetite layer is extremely modest. If at all, wuestite is formed, which is not disadvantageous to reduction. Hence result substantially enhanced reduction conditions for the fluidized bed zone arranged first in the flow direction of the iron-oxide-containing material.

Advantageously, the iron-oxide-containing material in any event is transferred to the consecutively arranged fluidized bed zone immediately after having reached the desired temperature.

According to a preferred embodiment, the temperature range between 400° C. and 580° C. is passed through while avoiding a residence time, the average temperature gradient within the range of between 400° C. and 580° C. amounting to at least 20° C./min and, preferably, 40° C./min.

If, in that first fluidized bed zone, a temperature of but below 400° C. is adjusted, the temperature range between 400 and 580° C. will be passed in the fluidized bed zone arranged second in the flow direction of the iron-oxide-containing material, there occurring at a substantially higher speed than would be possible under normal conditions in the first fluidized bed zone, since the temperature of the reducing gas in the second fluidized bed zone is still substantially higher and, in addition, the reduction potential is higher, too. The latter likewise impedes or reduces the formation of magnetite. In that case, the rapid passage through the critical temperature range takes place in the second fluidized bed zone also within a noncritical period of time.

If the critical temperature range is to be passed through only in the second fluidized bed zone, this may be effected in various ways.

Thus, this may, for instance, be reached in that the reducing gas fed to the first fluidized bed zone is subjected to cooling before being introduced into the first fluidized bed zone.

An effective temperature adjustment to below 400° C. in the first fluidized bed zone may also be obtained in that the reducing gas emerging from the fluidized bed zone arranged to follow the first fluidized bed zone in the flow direction of the iron-oxide-containing material is introduced into the first fluidized bed zone only partially and the reducing gas emerging from the first fluidized bed zone is recirculated into the first fluidized bed zone at least partially.

According to a preferred embodiment, the iron-oxide-containing material and the gas are indirectly cooled in the first fluidized bed zone, preferably by means of air or water.

It is also possible to directly cool the iron-oxide-containing material and the gas in the first fluidized bed zone, preferably by nozzling in water and/or water vapor.

According to a variant to be carried out in a particularly simple manner, maintenance under the critical temperature in the first fluidized bed zone is ensured in that the iron-oxide-containing material has a shorter residence time in the first fluidized bed zone than in the fluidized bed zones consecutively arranged in the flow direction of the iron-oxide-containing material.

Some variants are also available in order to pass through the critical temperature range in the first fluidized bed zone as rapidly as possible, i.e, for instance, within a maximum time of 5 minutes.

This may be achieved in that the reducing gas fed to the first fluidized bed zone is heated as a total or partial stream, preferably indirectly by means of a smoke gas, before being introduced into the first fluidized bed zone.

According to a preferred variant, the invention is realized in that the total amount, or only a partial amount, of the reducing gas emerging from the fluidized bed zone arranged to follow the first fluidized bed zone in the flow direction of the iron-oxide-containing material and at least a partial amount of a fresh and, preferably, unused reducing gas are fed into the first fluidized bed zone.

Another preferred embodiment is characterized in that oxygen or an oxygen-containing gas is supplied to the reducing gas fed to the first and/or consecutively arranged fluidized bed zone while effecting a partial combustion of the reducing gas, prior to its entry into the first fluidized bed zone.

A further variant is characterized in that oxygen or an oxygen-containing gas is introduced into the first and/or consecutively arranged fluidized bed zone while effecting a partial combustion of the reducing gas.

The critical temperature range also may be rapidly passed through in that the iron-oxide-containing material charged into the first fluidized bed zone is charged in the preheated state, preferably in the highly preheated state, and, in particular, at a temperature ranging above 250° C.

A further preferred embodiment is characterized in that the iron-oxide-containing material and the gas are indirectly heated in the first fluidized bed zone, preferably by means of a hot gas or by means of a smoke gas or by burning a burning gas.

It goes without saying that the object of the invention may be achieved also by applying two or several of the above-described variants in combination.

A plant according to the invention for carrying out the processes of the invention comprising several fluidized bed reactors consecutively arranged in series for receiving an iron-oxide-containing material with the iron-oxide-material being conducted from one fluidized bed reactor to another fluidized bed reactor via conveying ducts in one direction and the reducing gas being conducted from one fluidized bed reactor to another fluidized bed reactor via connecting ducts in the opposite direction is characterized in that a recuperator is provided in the fluidized bed reactor arranged first in the flow direction of the iron-oxide-containing material.

Plants for carrying out the processes according to the invention are defined in the subclaims. Such plants are partially known per se, for instance, from EP-A-0 571 358 (adjustment of an elevated temperature in the first reduction reactor). In addition, from U.S. Pat. No. 3,205,066 the partial combustion with oxygen or an oxygen-containing gas in a fluidized bed, from U.S. Pat. Nos. 3,982,901 and 3,983,927 the installation of heat exchangers in fluidized bed reactors, and from EP-A-0 345 467 the provision of jacketed jet heating pipes in fluidized bed reactors are known per se.

DETAILED DESCRIPTION OF THE PREFERRED EMBODIMENTS

Figure 1:
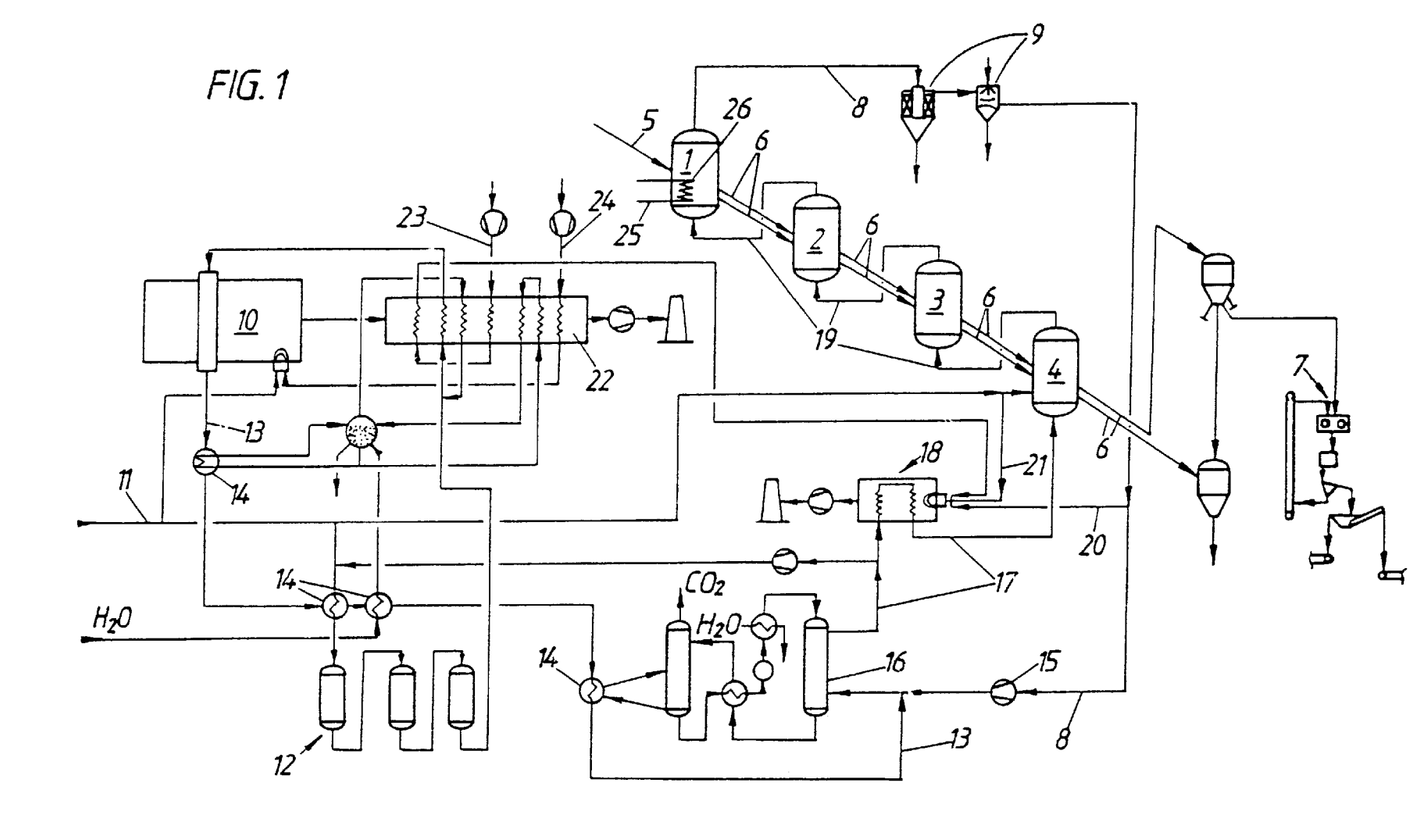
FIG. 1 is a diagram of a processing scheme according to the present invention.
Figure 2:
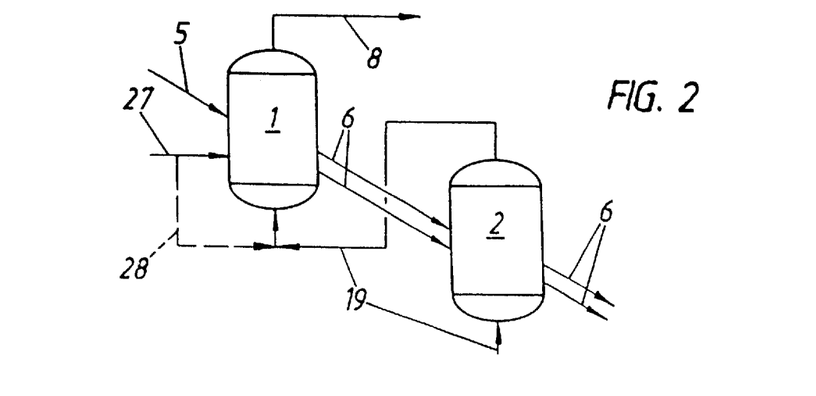
FIG. 2 illustrates a process for lowering the temperature in a fluidized bed reactor according to the present invention.
Figure 3:
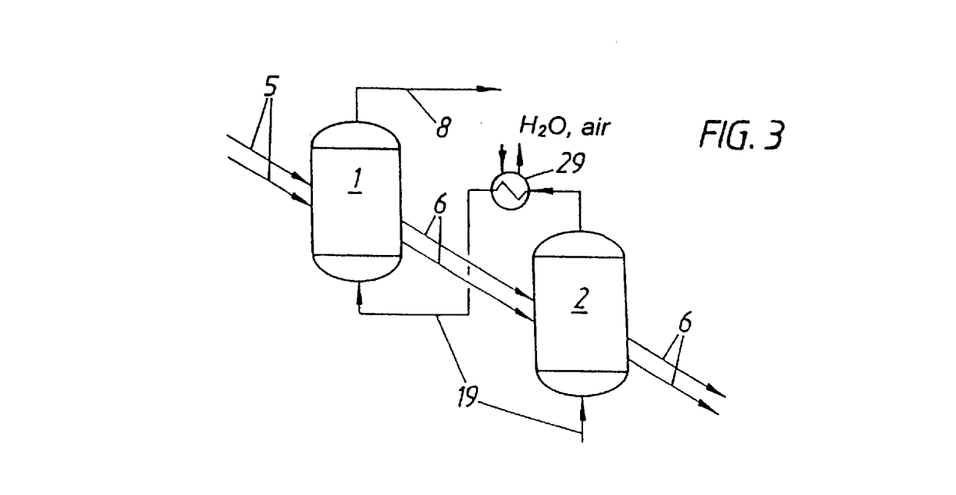
FIG. 3 illustrates another process for lowering the temperature in the fluidized bed reactor according to the present invention.
Figure 4:
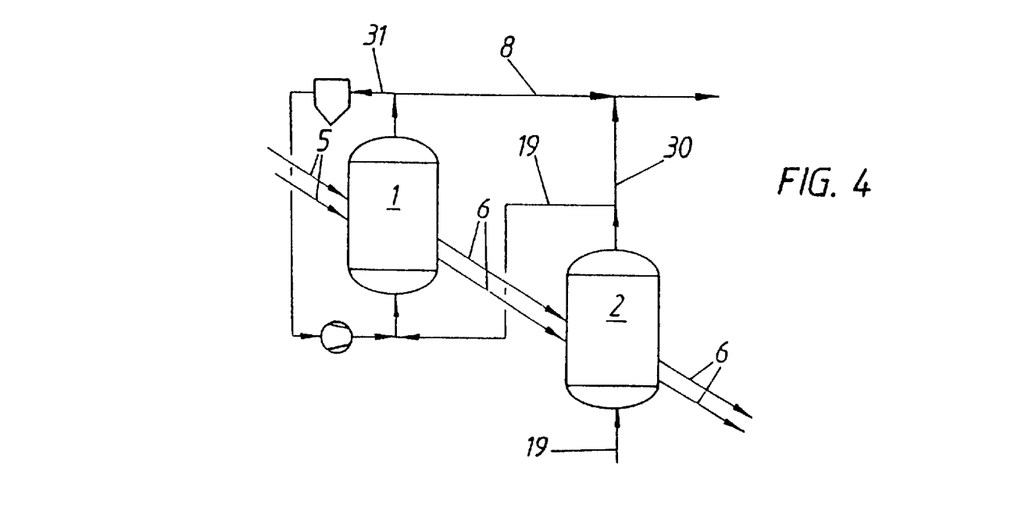
FIG. 4 illustrates the adjustment of the maximum temperature in the fluidized bed reactor according to the present invention.
Figure 9:
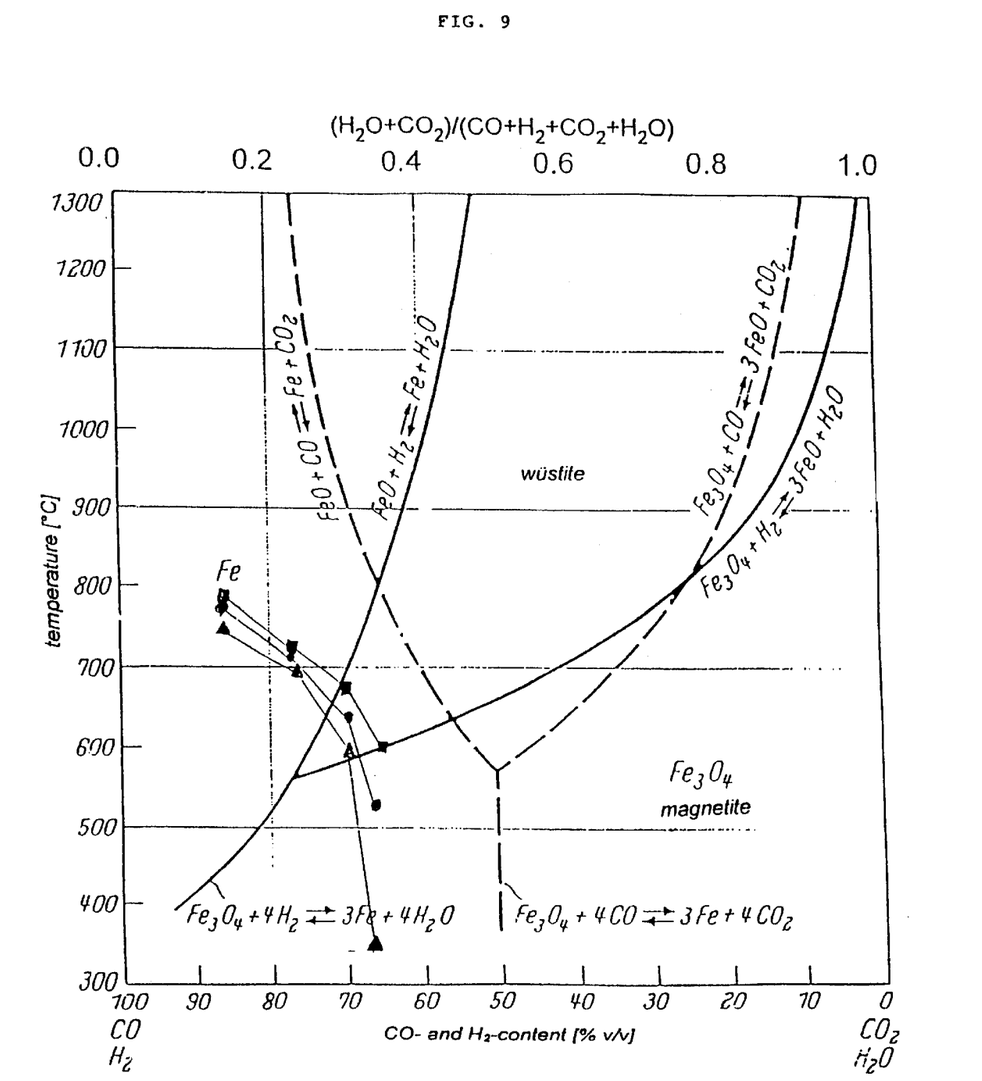
FIG. 9 is a Baur-Glaessner diagram illustrating the thermodynamics and magnetic formation in a reduction process.
Figure 10:
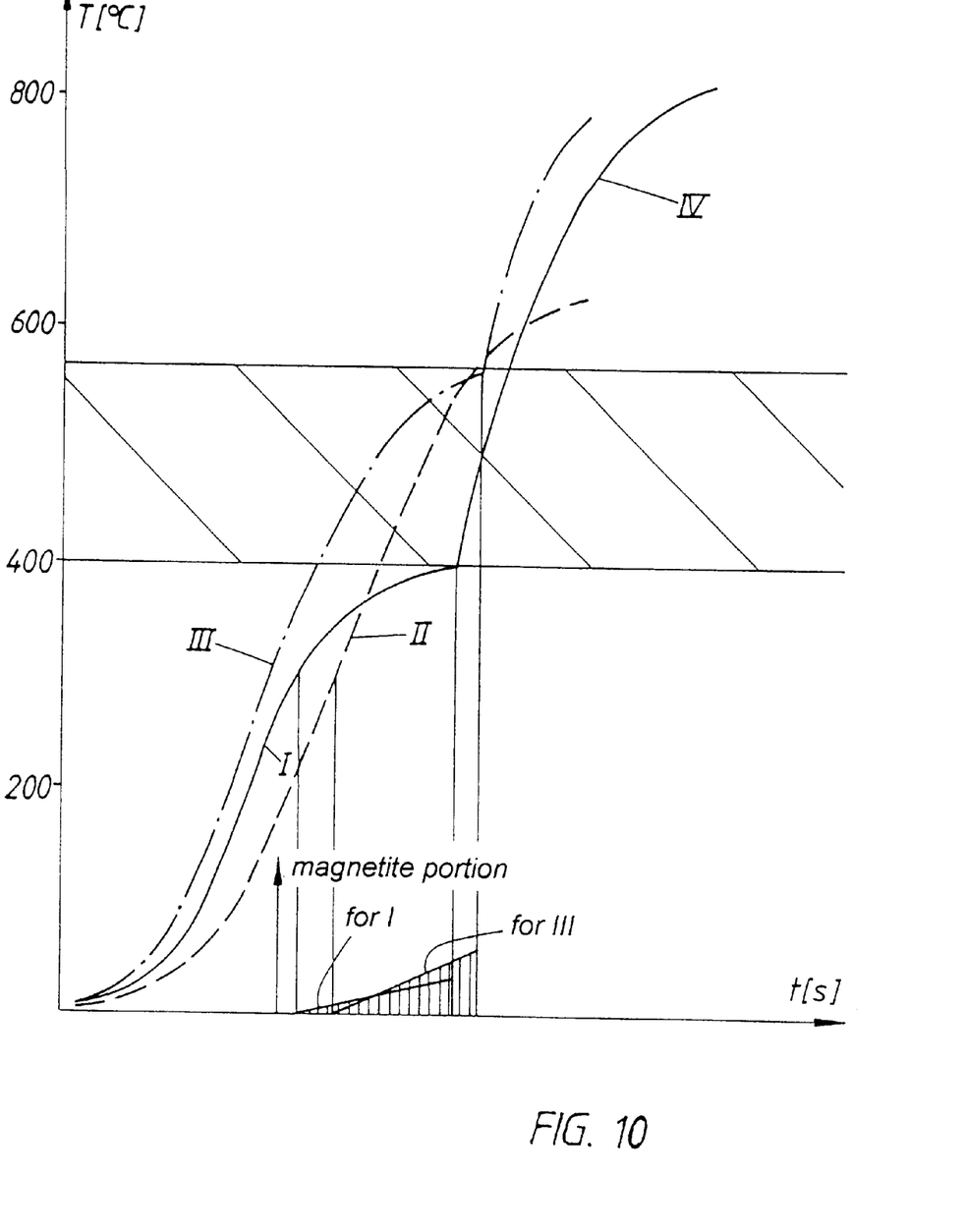
FIG. 10 is a time-temperature diagram illustrating three operating variants of the fluidized bed reaction according to the present invention.

In the following, the invention will be explained in more detail by way of the drawing, wherein FIG. 1 shows the process scheme of a preferred embodiment according to which a temperature of the iron-oxide-containing material of below 400° C. is kept in the first fluidized bed zone. FIGS. 2 to 4 depict a detail of the process scheme represented in FIG. 1, each in a modified embodiment, wherein a maximum temperature of 400° C. is adjusted in the first fluidized bed zone also according to these embodiments. The variants represented in FIGS. 5 to 8 show details of different embodiments of the process scheme according to FIG. 1 in a manner analogous to FIGS. 2 to 4, wherein a temperature of above 580° C. is, however, adjusted in the fluidized bed zone arranged first in the flow direction of the iron-oxide-containing material. FIG. 9 illustrates the Baur-Glaessner diagram, the course of reduction being entered with and without influence on the temperature level in the first fluidized bed zone. FIG. 10 illustrates various modes of operation according to the invention for heating in the first fluidized bed zone.

The plant of the invention according to FIG. 1 comprises four fluidized bed reactors 1 to 4 consecutively arranged in series, wherein iron-oxide-containing material such as fine ore via an ore supply duct 5 is supplied to the first fluidized bed reactor 1, in which heating to a predetermined temperature (and/or optionally prereduction) takes place, as will be explained in more detail below. Subsequently, the fine ore is conducted from one fluidized bed reactor to another fluidized bed reactor via conveying ducts 6, fluidized bed zones forming in each of the fluidized bed reactors 1 to 4. The completely reduced material (sponge iron) is hot-briquetted in a briquetting plant 7. If required, the reduced iron during briquetting is protected against reoxidation by an inert gas system not illustrated.

Prior to introducing the fine ore into the first fluidized bed reactor 1, it is subjected to ore preparation such as drying and screening, which is not illustrated in detail.

Reducing gas is conducted from one fluidized bed reactor 4 to another fluidized bed reactor 3 to 1 in counterflow to the ore flow and is carried off from the fluidized bed reactor 1 arranged last in the gas flow direction as a top gas through a top gas discharge duct 8 and cooled and scrubbed in a wet scrubber 9.

The production of the reducing gas is effected by reforming in a reformer 10 natural gas fed through duct 11 and desulfurized in a desulfurization plant 12. The gas formed by natural gas and vapor, which leaves the reformer 10, essentially consists of $H_2$, CO, $CH_4$, $H_2O$ and $CO_2$. That reformed natural gas through a reformed gas duct 13 is conveyed to one or several heat exchangers 14, in which it is cooled to 80 to 150° C., thus condensing water out of the gas.

The reformed gas duct 13 runs into the top gas discharge duct 8 after compression of the top gas by means of a compressor 15. The mixed gas thus forming is passed through a $CO_2$ scrubber 16 and freed from $CO_2$ and $H_2S$. It is then available as a reducing gas. This reducing gas via a reducing gas feed duct 17 is heated to a reducing gas temperature of about 800° C. in a gas heater 18 arranged to follow the $CO_2$ scrubber 16 and fed to the fluidized bed reactor 4 arranged first in the gas flow direction, where it reacts with the fine ores to produce directly reduced iron. The fluidized bed reactors 4 to 1 are arranged in series; the reducing gas gets from one fluidized bed reactor to another fluidized bed reactor through connecting ducts 19. The number of fluidized bed reactors depends on the respective circumstances such as the properties of the reducing gas, the reduction gradient desired, etc.

A portion of the top gas is sluiced out of the gas circuit 8, 17, 19 in order to avoid the enrichment of inert gases such as $N_2$. The sluiced out top gas through a branch duct 20 is supplied to the gas heater 18 for heating the reducing gas and is burnt there. Possibly lacking energy is supplemented with natural gas, which is fed via feed duct 21.

The sensible heat of the reformed natural gas emerging from the reformer 10 and of the reformer smoke gases is utilized in a recuperator 22 to preheat the natural gas after passage through the desulfurization plant 12, to produce the vapor required for reformation and to preheat the combustion air fed to the gas heater 18 via duct 23 as well as, if desired, also the reducing gas. The combustion air fed to the reformer 10 through duct 24 is preheated as well.

In order to avoid or minimize the formation of magnetite, a temperature of above 400° C. is avoided in the fluidized bed reactor 1 according to the embodiments represented in FIGS. 1 to 4. According to FIG. 1, this is effected by means of a heat exchanger 25 installed in the fluidized bed reactor 1, which heat exchanger comprises cooling spirals 26 or the like arranged in the interior of the fluidized bed reactor 1. The cooling spirals are passed through by water, which is converted into vapor. Water vapor may also be used as a cooling medium and utilized at another stage of the process. Instead of the cooling spirals, immersion heating surfaces may be inserted in the fluidized bed reactor 1.

By that measure, it is feasible to cool the already partially used reducing gas emerging from the fluidized bed reactor 2 to such an extent that the ore contained in the fluidized bed reactor 1 will not be heated to more than 400° C. Heating above 400° C. to the desired reduction temperature is effected in the fluidized bed reactor 2, in which the reducing gas coming from the fluidized bed reactor 3 heats the ore to above 580° C. within a very short time. Heating is effected so rapidly that the formation of magnetite is prevented as far as possible.

Lowering of the temperature in the fluidized bed reactor 1 also may be achieved by direct cooling with water and/or water vapor. This is illustrated in FIG. 2. Water or water vapor is fed into the fluidized bed reactor 1 either directly through duct 27 and/or through duct 28 into the connecting duct 19 leading to that fluidized bed reactor 1. The introduction of these media does not involve any disadvantages in terms of energy consumption, since the top gas emerging from the fluidized bed reactor 1 via the top gas discharge duct 8 is conducted through a scrubber 9, anyway, and residual cooling, which does not occur in the fluidized bed reactor 1, must be effected there.

According to FIG. 3, cooling of the fluidized bed zone in the fluidized bed reactor 1 is effected by providing a recuperative heat exchanger 29 in the connecting duct 19 from fluidized bed reactor 2 to fluidized bed reactor 1, which heat exchanger serves to cool the reducing gas introduced into the fluidized bed reactor 1 by means of water, air or the like. Cooling might also be effected by directly nozzling in water and/or water vapor.

According to FIG. 4, the adjustment of the maximum temperature of 400° C. in the fluidized bed reactor 1 is effected in that a portion of the reducing gas emerging from the fluidized bed reactor 2 is conducted directly to the top gas via a branch duct 30 and only the remaining portion mixed with a recirculated top gas emerging from the fluidized bed reactor 1 is introduced into the fluidized bed reactor 1. To this end, a branch duct 31 branches off the top gas discharge duct 8 departing from the fluidized bed reactor 1 and runs into the connecting duct 19.

Less heating of the ore also may be obtained by a shorter residence time of the ore in the fluidized bed reactor 1, thereby likewise positively influencing the reduction kinetics. In practice, this may be achieved by reducing the first fluidized bed reactor 1 in size.

Due to all of these measures, the fluidized bed reactor 1 no longer serves directly as a reducing zone but, in the first place, as a heating zone.

According to the variants represented in FIGS. 5, 6, 7 and 8, a temperature of above 580° C. is adjusted in the first fluidized bed reactor, wherein the temperature range—and this is essential to the invention—between 400 and 580° C. is passed through within a period of less than 5 minutes. This is not a gas temperature but the temperature of the iron-oxide-containing material charged, i.e., the fine ore.

Figure 5:
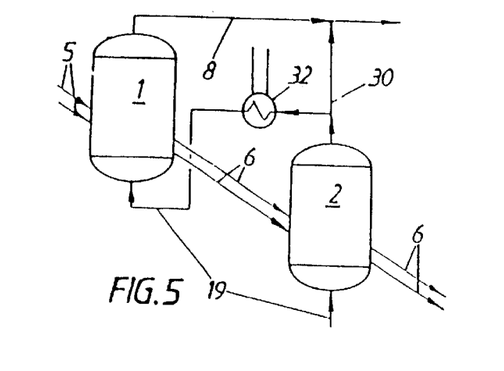
FIG. 5 illustrates a method of adjusting a temperature above 580° C. in the first fluidized bed reactor according to the present invention.

According to the embodiment illustrated in FIG. 5, this is achieved in that at least a portion of the already partially consumed reducing gas emerging from the fluidized bed reactor 2 is fed to the fluidized bed reactor 1 via a recuperative heat exchanger 32. Preferably, the heat exchanger is operated with smoke gas or any other hot gas.

Figure 6:
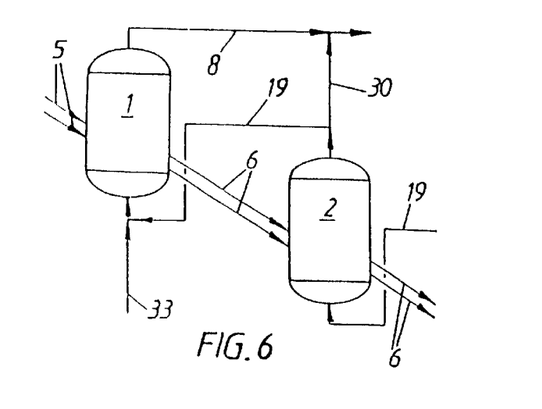
FIG. 6 illustrates an alternative method of adjusting a temperature above 580° C. in the first fluidized bed reactor according to the present invention.

According to the embodiment depicted in FIG. 6, the reducing gas derived from the fluidized bed reactor 2 and introduced into the fluidized bed reactor 1 is mixed with a fresh reducing gas so as to exhibit a substantially higher temperature. The fresh reducing gas admixed is fed to the fluidized bed reactor 1 through a branch duct 33 branching off the reducing gas feed duct 17. Since a portion of the reducing gas emerging from the fluidized bed reactor 2 is then replaced with fresh reducing gas, a portion of the reducing gas emerging from the fluidized bed reactor 2 may be introduced into the top gas discharge duct 8 via a branch duct 30. It is not necessarily required to admix a completely fresh reducing gas, it will do to add to the reducing gas emerging from the fluidized bed reactor 2 a reducing gas that has still a higher reduction potential.

Figure 7:
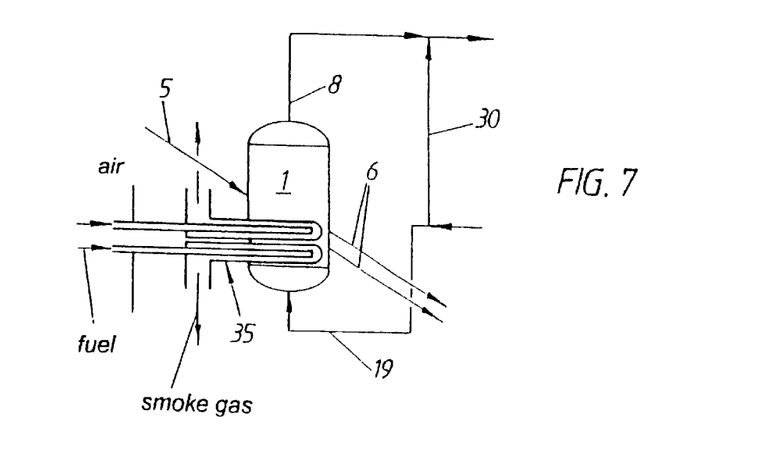
FIG. 7 illustrates another alternative method of adjusting a temperature above 580° C. in the first fluidized bed reactor according to the present invention.

According to FIG. 7, a recuperative heat exchanger 35 is incorporated in the fluidized bed reactor 1, through which a hot gas such as smoke gas streams. It is also possible to introduce into the heat exchanger a burning gas with air or another oxygen-containing gas or oxygen, thereby causing the combustion of the burning gas and hence a strong increase in the temperature of the ore charged into the fluidized bed reactor 1 within a short period of time in the manner according to the invention. The recuperator 35 then serves as a combustion chamber for a burner provided in it. The smoke gas forming may be used for drying the ore or for preheating the reducing gas. A partial stream of the reducing gas emerging from the fluidized bed reactor 2 is introduced into the top gas discharge duct via the branch duct 30.

Figure 8:
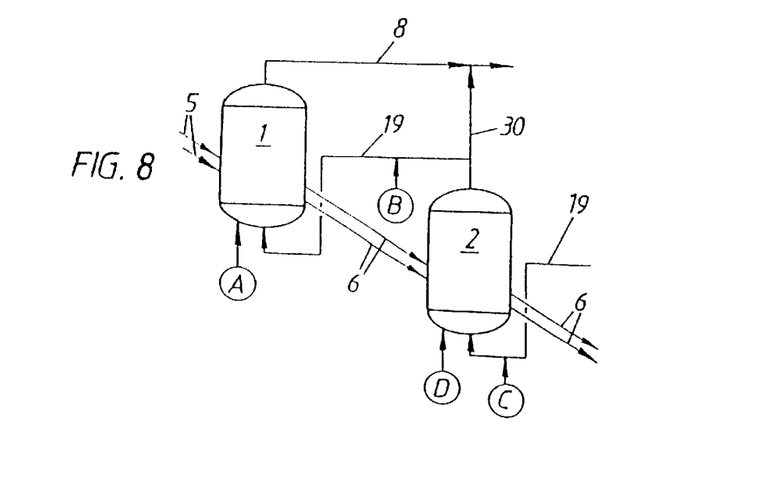
FIG. 8 illustrates a fourth alternative method of adjusting a temperature above 580° C. in the first fluidized bed reactor according to the present invention.

According to the configuration variant illustrated in FIG. 8, air or another oxygen-containing gas or oxygen is supplied to the system, thereby likewise raising the temperature in the fluidized bed reactor 1 to such an extent that the ore gets heated from 400° C. to 580° C. within 5 minutes. The supply of oxygen or an oxygen-containing gas may be effected into the connecting duct 19 (point B) connecting the fluidized bed reactor 2 with the fluidized bed reactor 1. It is, however, also conceivable to allow these media to directly flow into the fluidized bed reactor 2 and/or fluidized bed reactor 1 (points A and/or D) or even into the connecting duct 19 (point C) connecting the fluidized bed reactor 3 with the fluidized bed reactor 2. This results in the partial combustion of reducing gas, thus strongly increasing the temperature in the fluidized bed reactor 1 or fluidized bed reactor 2, respectively, or in the connecting duct 19. It is feasible in a relatively simple manner also by these measures to pass through the temperature range of between 400° C. and 580° C. and, preferably between 350° C. and 650° C., which is critical in terms of magnetite formation, within a period of 5 minutes recognized as critical. A partial stream of the reducing gas emerging from the fluidized bed reactor 2 is introduced into the top gas discharge duct 8 through branch duct 30.

Such a rapid heating of the iron ore in the critical temperature range also may be achieved in that an already preheated fine ore—for instance, preheated to a temperature of between 250 and 400° C.—is conducted through in the first fluidized bed reactor 1.

From FIG. 9, which is a Baur-Glaessner diagram, it is apparent that the formation of magnetite occurs in a reduction process without influencing the temperature level in the first fluidized bed reactor. That process is illustrated by round dots. (The Baur-Glaessner diagram is to be understood as a thermodynamic diagram and hence independent of the reaction kinetics and, thus, also of the case history of the reduction). At a temperature increase within the fluidized bed reactor 1 to above 580°—which process is illustrated by squares in FIG. 9—the formation of magnetite is avoided almost completely. Lowering of the temperature in the fluidized bed reactor is illustrated by triangles in FIG. 9. Since the critical temperature range is passed through very quickly in the consecutive fluidized bed zone, i.e., in the fluidized bed reactor 2, magnetite formation is limited, no interference with the reduction process occurring in any of the reduction stages.

FIG. 10, which is a diagram having the temperature plotted on its ordinate and the time plotted on its abscissa, in a schematic illustration indicates the temperature course for three operating variants of the fluidized bed reactor 1. According to variant I, which is represented by a curve drawn in full lines, a temperature of closely below 400° C. is adjusted in the fluidized bed reactor 1. It is apparent that the critical temperature range of between 400 and 580° C., which is indicated by a hatched field in FIG. 10, is not touched.

At a temperature of closely below 400° C., magnetite formation proceeds only so slowly that a potential magnetite layer on the ore grains does not constitute a layer impeding further reduction. Further reduction is represented by the curve line following curve line I and denoted by IV, which illustrates the heating of the iron-oxide-containing material or ore grains in the fluidized bed reactor 2. It is apparent that the critical temperature range of between 400 and 580° C. is passed through very quickly in the fluidized bed reactor 2, since the reducing gas in that fluidized bed reactor 2 is very hot and very avid. The time in which magnetite can form, although magnetite formation occurs very rapidly in that temperature range, is too short to allow the formation of a reduction impeding layer.

Curve line variant II—represented in broken lines—indicates the temperature conditions prevailing if a temperature of above 580° C. is adjusted in the first fluidized bed reactor 1. Also there, the critical temperature range of between 400 and 580° C. is very rapidly passed through and the time for the formation of a magnetite layer on the ore grains is too short to cause any disturbing interference with the reduction procedure.

Curve line variant III—represented by a dot-and-dash line—indicates heating if and when a temperature within the critical range, i.e., between 400 and 580° C., is adjusted in the fluidized bed reactor 1. In that case, it is important that heating proceeds particularly quickly in order to keep as short as possible the time spent by the iron-oxide-containing material or ore grains within that temperature range. In that case, it is also essential that the material is discharged from the fluidized bed reactor 1 and transferred into fluidized bed reactor 2 immediately after having reached the temperature desired for the fluidized bed reactor 1. Maintenance in the critical temperature range is to be avoided in any event, since, as already pointed out, magnetite formation occurs very rapidly in that critical temperature range and an accordingly thick magnetite layer might form on the ore grains.

The formation of magnetite is also illustrated in the diagram of FIG. 10 by the vertically hatched field shown in that diagram, the increasing magnetite portion being visible in the ordinate direction as a function of time.

What is claimed is:

1. A process for the direct reduction of particulate iron oxide-containing material by fluidization, wherein synthesis gas such as reformed natural gas is introduced as a reducing gas into a first fluidized bed zone and following fluidized bed zones consecutively arranged in series for the reducing gas and is conducted from one fluidized bed zone to another fluidized bed zone in counterflow to the particulate iron-oxide containing material, and wherein heating of the iron oxide-containing material is effected in the fluidized bed zone arranged first in the flow direction of the iron oxide-containing material and direct reduction is carried out in the following fluidized bed zones, the process comprising the steps of:

adjusting, in the first fluidized bed zone, a temperature of the iron oxide-containing material to be either below 400° C., or above 580° C., or a temperature ranging from 400 to 580° C., wherein, if the temperature of the iron oxide-containing material in the first fluidized bed zone is adjusted to be below 400° C., the temperature range between 400° C. and 580° C. in the following fluidized bed zone is passed through within a period of 10 minutes, and wherein, if the temperature of the iron oxide-containing material in the first fluidized bed zone is adjusted to be above 580° C., the temperature range between 400° C. and 580° C. is passed through within a period of maximally 10 minutes, and wherein, if the temperature of the iron oxide-containing material in the first fluidized bed zone is adjusted to be in the range of from 400° C. to 580° C., the iron-oxide-containing material remains within that temperature range for a maximum of 10 minutes and is passed on into the following fluidized bed zone immediately after having reached the desired temperature, whereby formation of magnetite on the iron-oxide-containing material is minimized by minimizing the time in which the iron-oxide-containing material is subjected to a temperature between 400° C. and 580° C.

2. A process according to claim 1, wherein, regardless of the temperature adjustment made in the first fluidized bed zone, the iron-oxide-containing material is transferred to the following fluidized bed zone immediately after having reached the desired temperature.

3. A process according to claim 1, wherein the temperature range between 400° C. and 580° C. is passed through while avoiding a residence time, the average temperature gradient within the range of between 400° C. and 580° C. amounting to at least 20° C./min.

4. A process according to claim 1, wherein the reducing gas fed to the first fluidized bed zone is subjected to cooling before being introduced into the first fluidized bed zone.

5. A process according to claim 1, wherein a reducing gas emerging from the following fluidized bed zone is introduced into the first fluidized bed zone only partially and the reducing gas emerging from the first fluidized bed zone is recirculated into the first fluidized bed zone at least partially.

6. A process according to claim 1, wherein the iron oxide-containing material and the gas are indirectly cooled in the first fluidized bed zone.

7. A process according to claim 1, wherein the iron oxide-containing material and the gas are directly cooled in the first fluidized bed zone.

8. A process according to claim 1, wherein the reducing gas fed to the first fluidized bed zone is heated as a total or partial stream before being introduced into the first fluidized bed zone.

9. A process according to claim 1, further comprising the step of feeding into the first fluidized bed zone the total amount, or only a partial amount, of the reducing gas emerging from the following fluidized bed zone, and at least a partial amount of a fresh gas.

10. A process according to claim 1, wherein oxygen or an oxygen-containing gas is supplied to the reducing gas fed to the first and/or consecutively arranged fluidized bed zone while effecting a partial combustion of the reducing gas, prior to its entry into the first fluidized bed zone.

11. A process according to claim 1, wherein oxygen or an oxygen-containing gas is introduced into the first and/or consecutively arranged fluidized bed zone while effecting a partial combustion of the reducing gas.

12. A process according to claim 1, wherein the iron-oxide-containing material charged into the first fluidized bed zone is charged in the preheated state.

13. A process according to claim 1, wherein the iron oxide-containing material and the gas are indirectly heated in the first fluidized bed zone.

14. A process according to claims 1, wherein the iron-oxide-containing material has a shorter residence time in the first fluidized bed zone than in the following fluidized bed zones.

15. A process according to claim 1, wherein, if the temperature of the iron-oxide-containing material in the first fluidized bed zone is adjusted to be above 580° C., the temperature range between 400° C. and 580° C. is passed through within a period of maximally 5 minutes.

16. A process according to claim 3, wherein the average temperature gradient range amounts to at least 40° C./min.

17. A process according to claim 6, wherein the iron oxide-containing material and the gas are indirectly cooled in the first fluidized bed zone by means of air or water.

18. A process according to claim 7, wherein the iron oxide-containing material and the gas are directly cooled in the first fluidized bed zone by nozzling in water and/or water vapor.

19. A process according to claim 8, wherein the reducing gas fed to the first fluidized bed zone is indirectly heated by means of a smoke gas.

20. A process according to claim 13, wherein the iron oxide-containing material and the gas are indirectly heated by means of a hot gas, a smoke gas or by burning a burning gas.

* * * * *